United States Patent
Kim et al.

(10) Patent No.: US 12,030,782 B2
(45) Date of Patent: Jul. 9, 2024

(54) METHOD FOR PRODUCING HYDROPHOBIC SILICA AEROGEL GRANULES

(71) Applicant: LG CHEM, LTD., Seoul (KR)

(72) Inventors: Young Hun Kim, Daejeon (KR); Je Kyun Lee, Daejeon (KR); Myung Eun Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1035 days.

(21) Appl. No.: 16/754,545

(22) PCT Filed: Feb. 14, 2019

(86) PCT No.: PCT/KR2019/001845
§ 371 (c)(1),
(2) Date: Apr. 8, 2020

(87) PCT Pub. No.: WO2019/160368
PCT Pub. Date: Aug. 22, 2019

(65) Prior Publication Data
US 2020/0255295 A1    Aug. 13, 2020

(30) Foreign Application Priority Data
Feb. 14, 2018  (KR) .................. 10-2018-0018623

(51) Int. Cl.
C01B 33/158   (2006.01)
B01J 13/00    (2006.01)
C01B 33/159   (2006.01)

(52) U.S. Cl.
CPC ....... *C01B 33/1585* (2013.01); *B01J 13/0091* (2013.01); *C01B 33/159* (2013.01); *C01P 2004/60* (2013.01); *C01P 2006/12* (2013.01)

(58) Field of Classification Search
CPC ... C01B 33/1585; C01B 33/158; C01B 33/18; C01B 33/163; C01B 33/166;
(Continued)

(56) References Cited

U.S. PATENT DOCUMENTS 6,481,649 B1   11/2002  Schmidt
2012/0225003 A1   9/2012  Joung et al.
(Continued)

FOREIGN PATENT DOCUMENTS

CN    104445224      3/2015
CN    105377759 A    3/2016
(Continued)

OTHER PUBLICATIONS

WO-2017090911-A1, see machine translation, Jun. 2017 Kim et al.*
(Continued)

*Primary Examiner* — Smita S Patel
(74) *Attorney, Agent, or Firm* — Bryan Cave Leighton Paisner LLP

(57) ABSTRACT

Provided is a method for producing hydrophobic silica aerogel granules and hydrophobic silica aerogel granules produced thereby, the hydrophobic silica aerogel granules having a suppressed level of specific surface area deterioration and scattering properties. In the method for producing the hydrophobic silica aerogel granules, surface modification, gelation, and solvent substitution can be simultaneously performed in one step, thereby decreasing production time and increasing productivity. Also, by adjusting the addition amount of a non-polar organic solvent when proceeding with a reaction, hydrophobic silica aerogel granules with suppressed scattering properties can be produced. In addition, the hydrophobic silica aerogel granules are silica aerogel particles induced to agglomerate with each other (Continued)

through physical bonding, so that there is an advantage in that the granules can be easily changed into a powder form, thereby having excellent industrial applicability.

10 Claims, 4 Drawing Sheets

(58) Field of Classification Search
CPC .............. C01P 2006/12; C01P 2004/60; C01P 2004/50; B01J 13/0091
See application file for complete search history.

(56) References Cited

U.S. PATENT DOCUMENTS

| | | |
|---|---|---|
| 2013/0106008 A1 | 5/2013 | Ahn et al. |
| 2016/0280557 A1 | 9/2016 | Kim et al. |
| 2016/0291206 A1 | 10/2016 | Van Dijck et al. |
| 2017/0369326 A1 | 12/2017 | Kim et al. |
| 2018/0001576 A1 | 1/2018 | Koebel et al. |
| 2018/0002181 A1 | 1/2018 | Kim et al. |
| 2018/0237596 A1 | 8/2018 | Kim et al. |
| 2019/0256363 A1 | 8/2019 | Yodyingyong |

FOREIGN PATENT DOCUMENTS

| | | | |
|---|---|---|---|
| CN | 105745284 A | 7/2016 | |
| CN | 106745003 | 5/2017 | |
| CN | 107018658 A | 8/2017 | |
| CN | 107108237 A | 8/2017 | |
| EP | 2927194 A1 | 10/2015 | |
| EP | 3053952 A1 | 8/2016 | |
| EP | 3219670 A1 | 9/2017 | |
| JP | H06-144828 | 5/1994 | |
| JP | 2001523162 | 11/2001 | |
| JP | 2003-206124 | 7/2003 | |
| JP | 2012-172378 | 9/2012 | |
| JP | 2018-511663 | 4/2018 | |
| JP | 2020-504070 | 2/2020 | |
| KR | 10-20010012153 | 2/2001 | |
| KR | 10-20120126741 | 11/2012 | |
| KR | 10-2013-0035712 | 4/2013 | |
| KR | 10-20140146814 | 12/2014 | |
| KR | 10-2015-0093063 | 8/2015 | |
| KR | 10-20150093064 | 8/2015 | |
| KR | 10-20170062260 | 6/2017 | |
| KR | 10-20170062261 | 6/2017 | |
| WO | WO-2017090911 A1 * | 6/2017 | ........... C01B 33/154 |
| WO | WO-2017171279 A1 * | 10/2017 | ........... C01B 33/158 |

OTHER PUBLICATIONS

WO-2017171279-A1, see machine translation, Oct. 2017, Kim et al.*
KR20150093063—Kim et al, machine translation, Aug. 2015.*
Wu et al., "Preparation of Silica Aerogels via Ambient Pressure Drying," Progress in Chemistry 22(10):1892-1900 (2010). English Language Abstract included.

* cited by examiner

METHOD FOR PRODUCING HYDROPHOBIC SILICA AEROGEL GRANULES

CROSS-REFERENCE TO RELATED APPLICATIONS

This application is a National Stage Application of International Application No. PCT/KR2019/001845 filed on Feb. 14, 2019, which claims the benefit of Korean Patent Application No. 10-2018-0018623, filed on Feb. 14, 2018, in the Korean Intellectual Property Office, the disclosure of which is incorporated herein in its entirety by reference.

TECHNICAL FIELD

The present invention relates to a method for producing hydrophobic silica aerogel granules with suppressed scattering properties.

BACKGROUND

An aerogel is a super-porous, high specific surface area (≥600 m$^2$/g) material having a porosity of about 90-99.9% and a pore size in the range of 1-100 nm, and is a material excellent in ultra-light weight, super heat insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively studied.

The biggest advantage of an aerogel is that the aerogel has super-insulation properties exhibiting a thermal conductivity of 0.300 W/m·K or less, which is lower than that of an organic insulation material such as conventional Styrofoam. In addition, fire vulnerability and the generation of harmful gases in case of fire which are fatal weaknesses of an organic insulation material can be solved.

In general, an aerogel is produced by preparing a wet gel from a silica precursor such as water glass and TEOS, and removing a liquid component inside the wet gel without destroying a micro-structure. A silica aerogel can be typically classified into three types, i.e., powder, granule, and monolith, and the silica aerogel is generally produced in the form of powder.

A powder-type silica aerogel can be made into a composite with fibers and can be commercialized in the form of an aerogel blanket or an aerogel sheet. Such an aerogel blanket and an aerogel sheet can be bent, folded, or cut in any size or shape due to the flexibility thereof. Therefore, the powder-type silica aerogel can be applied not only to industrial applications such as heat insulation panels for LNG carriers, industrial insulation materials, spacesuits, transportation, vehicles, and insulation materials for electric power production, but also to household goods such as jackets and sports shoes. In addition, when a silica aerogel is used in fireproof doors as well as roofs and floors in housing such as an apartment, there is a great effect in fire prevention.

However, due to the high porosity and very low tap density and small particle size thereof, silica aerogel powder is scattered, which makes it difficult to handle the silica aerogel powder, and also has a disadvantage in that it is not easy to fill the silica aerogel powder.

Also, a silica aerogel monolith has high transparency with respect to visible light regions, but is limited in size to be produced, has difficulty in being molded into various shapes, and is easily broken.

In order to overcome the limitations of silica aerogel powder and a silica aerogel in a monolith form, there have been attempts to prepare silica aerogel granules having a size of 0.5 mm or more to improve ease of handling and shape correspondence. For example, there are methods in which a reaction solution obtained by hydrolyzing alkoxy silane is prepared as a filler, and then the filler is gelled by a polycondensation reaction with a catalyst, subjected to a hydrophobic treatment by being reacted with a hydrophobizing agent, followed by supercritical drying to obtain hydrophobic silica aerogel granules, or in which aerogel particles with an add-on, an additive, and a binder are provided to a molding apparatus and then pressed to prepare silica aerogel granules. Typically, a method for producing a granule form using chemical bonding has been proposed.

However, the above-described granulation methods using chemical bonding use an additive such as an auxiliary granulation device and a binder, so that there is a disadvantage in that a technically complicated process and a long process time are required. In addition, when a silica aerogel is mass-produced by the above-described methods, a complicated processing procedure and a large amount of investment costs are required, thereby requiring a large amount of time and expensive chemicals, so that there are disadvantages in that production costs are increased and the particle size of a silica aerogel to be finally obtained is either not uniform or too large.

In addition, since granules are formed by chemical bonding, in order to change the granules into a typically used powder state, it is necessary to break an internal bond using a different chemical reaction. Therefore, since a high-cost process requiring additional equipment and the like needs to be added, it is difficult to change the granules into a powder state, so that the use of the granules is limited.

Under the background as described above, the present inventors have studied a method for producing silica aerogel granules which can be granulated using physical bonding so as to be used as powder only by a simple grinding process when necessary, while improving ease of handling and shape correspondence by complementing disadvantages of the powder. The present inventors have found that in adding a surface modifier and a non-polar organic solvent to a water glass dispersion, by adjusting the addition amount of the non-polar organic solvent when performing a reaction, it is possible to obtain silica aerogel granules which have suppressed scattering properties and are easy to be changed into powder, and completed the present invention.

PRIOR ART DOCUMENT

Patent Document (Patent Document 1) KR2001-0012153A

BRIEF DESCRIPTION

Technical Problem

An aspect of the present invention provides a method for producing hydrophobic silica aerogel granules with suppressed scattering properties by using the addition amount of a non-polar organic solvent to easily control a surface modification reaction.

Another aspect of the present invention provides hydrophobic silica aerogel granules produced by the production method.

Technical Solution

According to an aspect of the present invention, there is provided a method for producing hydrophobic silica aerogel granules, the method including 1) adding a water glass solution to an inorganic acid to prepare a water glass dispersion, 2) preparing a hydrophobic silica wet gel by adding the water glass dispersion, a surface modifier, and a non-polar organic solvent into a reactor to be subjected to a reaction, and 3) drying the hydrophobic silica wet gel, wherein the non-polar organic solvent is added in an amount of greater than 83 vol % to less than 100 vol % based on the volume of the silica wet gel.

Advantageous Effects

According to a method for producing hydrophobic silica aerogel granules of the present invention, surface modification, gelation, and solvent substitution can be simultaneously performed in one step, and thus, production time is short, so that productivity and economic feasibility can be excellent. Also, hydrophobic silica aerogel granules having low scattering properties, and thus, easy to be handled, can be produced.

In addition, the method for producing hydrophobic silica aerogel granules according to the present invention can prepare hydrophobic silica aerogel granules which can maintain a level for exhibiting super-porosity in terms of industrial availability without the deterioration of specific surface area, and which are produced in a granule form, and thus, are easy to be handled, have excellent processability, and improve process efficiency with the excellent processability when forming a mixture with other materials.

In addition, the method for producing hydrophobic silica aerogel granules according to the present invention forms granules by physical bonding, and thus, the granules can be easily changed into a powder form. Therefore, the method can be applied to every field to which granules or powders can be applied, so that the method can prepare hydrophobic silica aerogel granules having excellent industrial applicability.

BRIEF DESCRIPTION OF THE DRAWING

The following drawings attached herein illustrate detailed embodiments of the present invention by example, and serve to enable technical concepts of the present invention to be further understood together with detailed description of the invention given below, and therefore the present invention should not be interpreted only with matters in such drawings.

DETAILED DESCRIPTION

Figure 1:
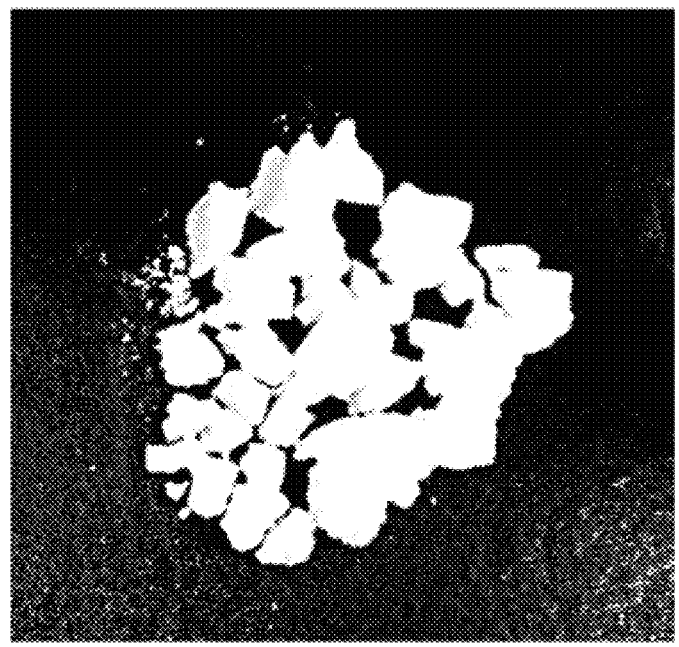
FIG. 1 is a photograph of silica aerogel granules of Example 1 of the present invention.

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor can properly define the meaning of the words or terms to best explain the invention.

The present invention provides a method for producing hydrophobic silica aerogel granules with suppressed scattering properties.

In general, a silica wet gel produced using water glass has a form in which pores are filled with water which is a solvent, and when the solvent is simply dried to be removed, the solvent in a liquid phase vaporizes into a gaseous phase and due to the high surface tension of water at a gas/liquid interface, it is likely that contraction and cracking occurs in the structure of the pores, thereby causing the reduction in surface area and change in the structure of the pores. Accordingly, in order to maintain the pore structure of the wet gel, it is necessary to substitute water having a high surface tension with an organic solvent having a relatively low surface tension, and there is a need for a technique for washing and drying a wet gel without causing the contraction thereof while maintaining the structure of the wet gel.

In addition, the dried silica aerogel maintains a low thermal conductivity rate just after being dried, but absorbs water in the air due to the hydrophilic properties of a silanol group (Si—OH) on the surface of silica, thereby having a disadvantage in that the thermal conductivity is gradually increased. Therefore, in order to maintain a low thermal conductivity, there is a need to modify the surface of the silica aerogel to be hydrophobic. Therefore, a method in which the surface of the silica aerogel is modified to be hydrophobic using a surface modifier is being used.

In addition, the hydrophobic silica aerogel is typically produced in the form of powder. However, due to the high porosity and very low tap density and small particle size thereof, silica aerogel powder has high scattering properties, which makes it difficult to process and handle the same, and due to the scattering properties and low density thereof, when mixed with other materials, there is a disadvantage in that processability and process efficiency are deteriorated.

In the present invention, ease of handling refers to physical properties affected by scattering properties. When scattering properties are great, for example, when a silica aerogel is stored or transported, the silica aerogel is scattered in the air, so that there can be a problem in that the amount of the silica aerogel when initially stored or transported can be different from the amount thereof over time. In addition, when processed into a molded product, even when a desired amount of silica aerogel is accurately weighed and injected, the desired amount of silica aerogel may not be injected due to the scattering properties thereof, so that it may be difficult to manufacture a molded product having required physical properties, or each molded product manufactured may have different physical properties, making it difficult to ensure production stability. In the present invention, all of the above phenomena are considered to be a measure for determining ease of handling, and it can be seen that the ease of handling is low in the case of the above example. In addition, ease of handling is not limited to the example. Any phenomenon that may act as a variable in terms of utilizing a silica aerogel due to scattering properties can be a measure for determining the ease of handling.

Accordingly, the present invention provides a method for producing hydrophobic silica aerogel granules having an excellent pore structure and hydrophobicity of a silica aerogel while having suppressed scattering properties.

The method according to an embodiment of the present invention includes 1) adding a water glass solution to an inorganic acid to prepare a water glass dispersion, 2) preparing a hydrophobic silica wet gel by adding a surface modifier and a non-polar organic solvent to the water glass dispersion to be subjected to a reaction, and 3) drying the hydrophobic silica wet gel, wherein the non-polar organic solvent is added in an amount of greater than 83 vol % to less than 100 vol % based on the volume of the silica wet gel.

Step 1

Step 1 is a step for preparing a water glass dispersion. The water glass dispersion can be prepared by adding a water glass solution to an inorganic acid.

Specifically, the water glass dispersion can be a mixture of a water glass solution and an inorganic acid, the mixture is prepared by adding and then mixing a water glass solution with an inorganic acid. At this time, the water glass dispersion can contain an inorganic acid in a molar ratio of 1 to 3, preferably 1.1 to 2.5, more preferably 1.2 to 2.3 based on water glass in a water glass solution. When the above numerical range is satisfied, a suitable pH environment can be created to induce a smooth gelation reaction in Step 2. In addition, when the above numerical range is satisfied, a problem which can be caused because an inorganic acid is contained in a ratio that is too low based on water glass, that is, a problem in that the pH in the water glass dispersion is too high, thereby allowing a gelation reaction to occur first in the water glass dispersion of Step 1 can be prevented. Also, a problem which can be caused because an inorganic acid is contained in a ratio that is too high based on water glass, that is, a problem in that the pH of the water glass dispersion is formed to be too low to be increased to induce a gelation reaction in Step 2, thereby not allowing the gelation reaction to be smoothly performed can be prevented.

The water glass solution can be a diluted solution prepared by adding and then mixing distilled water with water glass. The water glass can be sodium silicate ($Na_2SiO_3$) which is an alkali silicate salt obtained by melting silicon dioxide ($SiO_2$) and alkali.

The water glass dispersion can contain 1 wt % to 11 wt % of silicon dioxide ($SiO_2$). When the silicon dioxide in the water glass dispersion satisfies the above range, the content of silicon dioxide is sufficient enough to allow a silica aerogel to be properly formed during a gelation reaction and the ratio of pores can be increased, so that the specific surface area can be further improved.

The inorganic acid can be mixed with the silicon dioxide in the water glass solution in the water glass dispersion and react with a surface modifier in a surface modifier solution to be described later to activate the decomposition of the surface modifier, and the generation of ammonia due to the decomposition of the surface modifier can be increased. The ammonia can increase the pH in a reactor and create a basic environment to induce gelation. In addition, as the decomposition of the surface modifier is activated, there is an advantage in that a surface modification reaction is facilitated. The inorganic acid is not particularly limited, but can be one or more selected from the group consisting of nitric acid, hydrochloric acid, sulfuric acid, and hydrofluoric acid. Specifically, the inorganic acid can be nitric acid.

Also, the pH of the water glass dispersion can be 0.1 to 4.

Step 2

Step 2 is a step for preparing a hydrophobic silica wet gel, and can be performed by adding the water glass dispersion, a surface modifier, and a non-polar organic solvent into a reactor to be subjected to a reaction. Specifically, the hydrophobic silica wet gel can be produced by adding the water glass dispersion, a surface modifier, and a non-polar organic solvent into a reactor to be subjected to a reaction.

At this time, the non-polar organic solvent can be added in an amount of greater than 83 vol % to less than 100 vol %, preferably 85 vol % to 97 vol %, more preferably 92 vol % to 97 vol %, even more preferably 95 vol % to 97 vol % based on the volume (100 vol %) of the silica wet gel.

When the non-polar organic solvent is injected in an amount of 83 vol % or less based on the volume of the silica wet gel, the amount of the non-polar organic solvent is too small compared to the volume of silica wet gel to be produced so that solvent substitution may not occur smoothly, allowing too much moisture to be present in the silica wet gel. Therefore, when drying, contraction occurs due to the removal of the moisture, so that there may be a problem in that the physical properties of silica aerogel, such as pore properties and specific surface area, may be significantly deteriorated. In addition, when the non-polar organic solvent is injected in an amount 100 vol % or more based on the volume of the water glass solution, solvent substitution actively occurs so that moisture present in the wet gel is mostly removed. Therefore, when drying, the agglomeration of silica wet gel particles which is caused by the evaporation of moisture in silica wet gel pores does not occur, thereby synthesizing a hydrophobic silica aerogel in a powder form, so that there may be a problem in that scattering properties are great and processing efficiency is lowered during processing.

On the contrary, in the present invention, the addition amount of a non-polar organic solvent satisfies the above numerical range, so that when drying, a contraction phenomenon is mitigated to secure a specific surface area of a level which can satisfy industrial availability and pore properties are not deteriorated. At the same time, silica wet gel particles present around can be attracted by capillary pressure generated when moisture present in some pores of the silica wet gel evaporate, so that after the drying, a silica aerogel in a granule formation in which silica aerogel particles are physically coupled by spontaneous force can be produced.

The water glass dispersion, the surface modifier, and the non-polar organic solvent can be simultaneously injected into the reactor, or can be sequentially injected thereinto. When sequentially injected, although not particularly limited, the water glass dispersion can be added into the reactor followed by the surface modifier and the non-polar organic solvent to be subjected to a reaction.

Specifically, the surface modifier and the non-polar organic solvent can be added after the water glass dispersion is added into the reactor and when the temperature in the reactor reaches 25° C. to 95° C. That is, after the water glass dispersion is added into a reactor and then the temperature inside the reactor is raised to be in the above range, the surface modifier and the non-polar organic solvent can be added thereinto to proceed with a reaction. At this time, the reactor can be a reactor having a stirrer, and the reaction can be performed while stirring. The stirring is not particularly limited, but can be, for example, performed at a rate of 50 rpm to 700 rpm.

Also, the surface modifier and the non-polar organic solvent can be stirred to be prepared in the form of a mixed solution before being added to a reactor, and then added into the reactor. Specifically, a non-polar organic solvent added with a surface modifier and mixed therewith can be added into a reactor. At this time, the concentration of the surface modifier in a mixed solution of the surface modifier and the non-polar organic solvent can be 0.1 M to 4.0 M. That is, the mixed solution of the surface modifier and the non-polar organic solvent can be prepared by adding the surface modifier to the non-polar organic solvent in an amount of 0.1 M to 4.0 M, followed by mixing.

In addition, the surface modifier can be added in an amount such that the molar ratio of the surface modifier with respect to water glass in the water glass dispersion is 0.1 to 10, preferably 0.1 to 5, more preferably 0.3 to 3. When the amount of a surface modifier with respect to water glass satisfies the above range, the amount of the surface modifier capable of reacting with a silanol group (Si—OH) in a water glass dispersion is sufficient, so that surface modification reactivity can be further improved, and surface modification (hydrophobization) is easily achieved. Accordingly, a condensation reaction is suppressed when drying, thereby further improving the pore size of a silica aerogel finally produced and implementing porosity. Also, by using an appropriate amount of a surface modifier, it is possible to prevent a problem in which an expensive surface modifier is wasted which deteriorates economic feasibility.

The surface modifier can be one selected from the group consisting of trimethylchlorosilane (TMCS), hexamethyldisilazane (HMDS), methyltrimethoxysilane, trimethylethoxysilane, ethyltriethoxysilane, and phenyltriethoxysilane, and can be hexamethyldisilazane (HMDS).

In the present invention, a silica aerogel produced by performing a surface modification reaction using a surface modifier as described above can have excellent gel structure strength compared to a silica aerogel produced using methyl silicate having a hydrophobic group as a silica precursor without using a surface modifier. Specifically, in the case of a precursor having one methyl group (hydrophobic group) in silane such as methyl silicate, during a gelation reaction, only a reaction site except for the methyl group forms a silica structural body of a network structure, and the methyl group which does not function as a reaction site does not form a silica structural body of a network structure and is exposed to the surface. Therefore, the structure strength of a gel produced can be relatively week compared to that of a silica aerogel applied with TMOS, TEOS, water glass, and the like containing relatively more reaction sites without containing a hydrophobic or inert substituent as a silica precursor.

The non-polar organic solvent can be one or more selected from the group consisting of hexane, heptane, toluene and xylene, and preferably, can be heptane which is very low in compatibility with water. In addition, the heptane can be linear or branched, and although not particularly limited, can be n-heptane, which is a straight-chain, when considering the low compatibility thereof with water.

The production method according to an embodiment of the present invention can simultaneously perform a gelation reaction by reacting the water glass dispersion, the surface modifier, and the non-polar organic solvent, and surface modification and solvent substitution. Accordingly, the production method of the present invention may be excellent in productivity and economic feasibility due to short production time.

Specifically, according to the production method, a water glass dispersion containing an inorganic acid, a surface modifier, and a non-polar organic solvent are mixed to be subjected to a reaction, so that the decomposition of the surface modifier can be activated by the inorganic acid and the generation of ammonia can be increased due to the decomposition of the surface modifier. The ammonia can increase the pH in a reactor and create a basic environment to induce gelation. In addition, as the decomposition of the surface modifier is activated, there is an advantage in that a surface modification reaction is facilitated. In addition, while the surface modification reaction and gelation are proceeded by the non-polar organic solvent, solvent substitution can be achieved. When gelation, surface modification, and solvent substitution are simultaneously performed as described above, compared to a process in which surface modification and solvent substitution are sequentially performed after gelation, surface modification reaction efficiency is high so that there can be an advantage in that a silica aerogel having high hydrophobicity can be produced.

Here, the pH at which the gelation is induced can be 4.1 to 10, preferably 4.1 to 8.

In addition, in the present invention, gelation is to form a silica wet gel by forming a network structure from a silica precursor material, and the network structure can be a planar mesh structure in which specific polygons having one or more types of atomic arrangement are linked to each other, or a structure in which specific polyhedrons share their vertices, edges, faces, etc., with each other to form a three dimensional skeleton structure.

Step 3

Step 3 is a step for drying the hydrophobic silica wet gel to produce a hydrophobic silica aerogel.

According to an embodiment of the present invention, a step for discharging a residual aqueous solution layer after solvent substitution can further be included. At this time, since impurities can be discharged with the aqueous solution layer, it is not necessary to include a cleaning process so that there is an advantage in that processing efficiency is improved.

However, in the present invention, performing a cleaning step before the drying is not excluded. According to an embodiment of the present invention, in order to further improve impurities removal efficiency when necessary, a cleaning step can be further performed before the drying.

The cleaning is a step for removing impurities (sodium ions, unreacted substances, by-products, and the like) generated during a reaction to obtain a hydrophobic silica aerogel with high purity, and can be performed through a dilution process or an exchange process using a non-polar organic solvent.

Specifically, the dilution process can be a solution dilution process, and can be performed by additionally adding a non-polar inorganic solvent into a reactor in which the hydrophobic silica wet gel is produced to allow the non-polar inorganic solvent to be excessively present in the reactor. In addition, the exchange process can be a solution exchange process, and can be performed by repeating a step several times, the step in which an aqueous solution layer in the reactor is discharged after the reaction of Step 2 and then a non-polar inorganic solvent is injected, followed by discharging a separated aqueous solution layer again.

More specifically, the production method according to an embodiment of the present invention can be performed by additionally adding a non-polar organic solvent to the silica wet gel, followed by stirring for 20 minutes to 1 hour.

The drying step of the production method according to an embodiment of the present invention can be performed by a supercritical drying process or an atmospheric pressure drying process. More specifically, the drying process can be performed by an atmospheric pressure drying process under temperature conditions of 100-190° C., preferably 140-170° C. Although the duration of drying can be appropriately adjusted according to the amount of reactants and the temperature of drying, the drying process can be performed by an atmospheric pressure drying process preferably for 1 to 8 hours, more preferably 4 to 8 hours.

Here, atmospheric pressure refers to pressure when the pressure is not particularly decreased or increased, and can mean the same pressure as atmospheric pressure (1±0.3 atmospheric pressure).

When the drying temperature is satisfied, drying efficiency is good, and a silica aerogel having excellent physical properties, particularly excellent pore properties, can be formed after drying.

Accordingly, the production method of the present invention does not require an expensive high-pressure device, so that drying can be performed in a shorter period of time with less production costs compared to a typical supercritical drying process. Therefore, there is an advantage in that the productivity and economic feasibility of a silica aerogel can be increased.

Meanwhile, when an atmospheric pressure drying process is performed, there may be a disadvantage in that contraction and cracking of the structure of pores are likely to occur due to high capillary pressure and difference in solvent extraction rate. However, a silica aerogel produced by the production method of the present invention is produced in a form in which particles are agglomerated with each other while maintaining the structure of a wet gel, so that the wet gel can be dried by significantly mitigating contraction which deteriorates the physical properties of the silica aerogel, overcoming the disadvantage of the atmospheric pressure drying process.

In addition, the present invention provides hydrophobic silica aerogel granules produced by the production method. The hydrophobic silica aerogel granules can be silica aerogel particles agglomerated by physical bonding.

That is, in the present invention, "silica aerogel granules" means secondary particles in a form in which silica aerogel primary particles are spontaneously agglomerated with each other, and means the primary particles grouped by physical bonding. Also, in the present invention, the silica aerogel granules have an average particle diameter ($D_{50}$) of 0.1 cm or greater, and may be referred to as a "silica aerogel particle aggregation."

In addition, in the present invention, the "silica aerogel primary particles" can mean an individual silica aerogel particle which is independently present, or can mean particles forming powder.

In addition, in the present invention, the "silica aerogel secondary particles" are particles formed by the silica aerogel primary particles spontaneously agglomerated with each other, and can be an aggregation in which silica aerogel primary particles are agglomerated with each other, and can also mean silica aerogel granules defined in the present invention.

In addition, in the present invention, silica aerogel "powder" means a form consisting of the primary particles, and can have an average particle diameter ($D_{50}$) of less than 0.1 cm.

The above-described silica aerogel granules produced according to the production method of the present invention have a structure of being agglomerated by physical bonding, so that when producing granules in a powder form, the granules can be easily produced into a powder form only by a simple grinding process without an additional chemical process. Therefore, the granules can be easily used in every industrial field to which granules or powders are applied, and thus, have an advantage of having excellent industrial applicability.

The hydrophobic silica aerogel granules according to an embodiment of the present invention are characterized in having a specific surface area of 600 $m^2$/g to 1,000 $m^2$/g, preferably 640 $m^2$/g to 800 $m^2$/g, and are characterized in having an average particle diameter ($D_{50}$) of 0.1-2.5 cm, preferably 0.5-2.5 cm, more preferably 1.0-2.5 cm. That is, the present invention provides a production method capable of producing hydrophobic silica aerogel granules satisfying the above numerical ranges.

In the present invention, an average particle diameter ($D_{50}$) can be defined as a particle diameter corresponding to 50% of the cumulative amount in a particle diameter distribution curve of particles. The average particle diameter ($D_{50}$) can be measured by, for example, a laser diffraction method.

In addition, in the present invention, a hydrophobic silica aerogel can be produced in a granule formation, not in a powder formation, so that scattering properties are suppressed. Therefore, there is an effect in that the deterioration in processability and the deterioration in processing efficiency caused by scattering properties, which are disadvantages of a powder form, can be overcome.

As described above, the method for producing hydrophobic silica aerogel granules according to an embodiment of the present invention can perform surface modification, gelation, and solvent substitution simultaneously, and by adjusting the addition amount of a non-polar organic solvent which is added at this time, can produce a hydrophobic silica aerogel in a granule formation, not in a powder formation. Therefore, compared to a typical production method, productivity is excellent and ease of handling can be improved due to low scattering properties. In addition, the deterioration in processability when mixed with various materials due to the scattering properties and low density properties of a silica aerogel can be overcome, so that excellent processing efficiency can be achieved.

In addition, hydrophobic silica aerogel granules according to an embodiment of the present invention are silica aerogel particles forming granules by physical bonding, so that without an additional chemical decomposition reaction or expensive equipment, the granules can be produced in a powder formation only by a simple grinding process, and thus, can be widely applied in related industries.

Hereinafter, the present invention will be described in more detail with reference to Examples and Experimental Examples. However, the following Examples and Experimental Examples are merely illustrative of the present invention, and are not intended to limit the scope of the present invention.

EXAMPLE 1

8 g of nitric acid was prepared in advance. 100 ml of a water glass solution containing 14.1 g of water glass was slowly poured into the nitric acid to prepare a water glass dispersion. The water glass dispersion was injected into a reactor of 55° C. and then was stirred while maintaining the temperature. The amount of silicon dioxide ($SiO_2$) in the water glass dispersion prepared as described above was 4 wt %. Thereafter, 9 g of hexamethyldisilazane (HMDS) was added to n-heptane and stirred to be mixed therewith, and then the mixture was added to the reactor to which the water glass dispersion was injected to be subjected to a reaction to produce a hydrophobic silica wet gel. At this time, the n-heptane was added in an amount of 97 vol % based on the volume of the silica wet gel. When the produced hydrophobic silica wet gel completely surfaced to a heptane layer, an aqueous solution layer remaining in a lower portion of the reactor was discharged using a reactor outlet, and two hours later, a hydrophobic silica wet gel dispersed in the heptane layer was also recovered and completely dried in a forced circulation drier at 150° C. for 5 hours to produce hydrophobic silica aerogel granules.

EXAMPLE 2

Hydrophobic silica aerogel granules were produced in the same manner as in Example 1 except that n-heptane was added in an amount of 95 vol % based on the volume of the silica wet gel.

EXAMPLE 3

Hydrophobic silica aerogel granules were produced in the same manner as in Example 1 except that n-heptane was added in an amount of 92 vol % based on the volume of the silica wet gel.

EXAMPLE 4

Hydrophobic silica aerogel granules were produced in the same manner as in Example 1 except that n-heptane was added in an amount of 90 vol % based on the volume of the silica wet gel.

EXAMPLE 5

Hydrophobic silica aerogel granules were produced in the same manner as in Example 1 except that n-heptane was added in an amount of 87 vol % based on the volume of the silica wet gel.

EXAMPLE 6

Hydrophobic silica aerogel granules were produced in the same manner as in Example 1 except that n-heptane was added in an amount of 85 vol % based on the volume of the silica wet gel.

COMPARATIVE EXAMPLE 1

Hydrophobic silica aerogel powder was produced in the same manner as in Example 1 except that n-heptane was added in an amount of 110 vol % based on the volume of the silica wet gel.

COMPARATIVE EXAMPLE 2

Hydrophobic silica aerogel powder was produced in the same manner as in Example 1 except that n-heptane was added in an amount of 105 vol % based on the volume of the silica wet gel.

COMPARATIVE EXAMPLE 3

Hydrophobic silica aerogel powder was produced in the same manner as in Example 1 except that n-heptane was added in an amount of 100 vol % based on the volume of the silica wet gel.

COMPARATIVE EXAMPLE 4

Hydrophobic silica aerogel granules were produced in the same manner as in Example 1 except that n-heptane was added in an amount of 83 vol % based on the volume of the silica wet gel.

COMPARATIVE EXAMPLE 5

Hydrophobic silica aerogel granules were produced in the same manner as in Example 1 except that n-heptane was added in an amount of 80 vol % based on the volume of the silica wet gel.

COMPARATIVE EXAMPLE 6

Hydrophobic silica aerogel granules were produced in the same manner as in Example 1 except that n-heptane was added in an amount of 75 vol % based on the volume of the silica wet gel.

EXPERIMENTAL EXAMPLES

In order to compare and analyze the physical properties of the hydrophobic silica aerogel produced in each of Example 1 to Example 6 and Comparative Example 1 to Comparative Example 6, the specific surface area (BET, $m^2/g$), average particle diameter ($D_{50}$), and apparent density (3 seconds and 1 hour) thereof were measured. The results are shown in Table 1 below.

1) Specific Surface Area (BET, $m^2/g$)

The specific surface area was analyzed by the amount of nitrogen adsorption/desorption according to partial pressure ($0<p/p_0<1$) using a 3FLEX apparatus (Micrometrics Co.).

Specifically, 100 mg of each produced silica aerogel was put into a cylinder and moisture thereinside was completely removed under a vacuum state at 200° C. for 8 hours to measure the specific surface area using the specific surface area measuring device.

2) Measurement of Average Particle Diameter ($D_{50}$)

The particle diameter of about 50 granules of the silica aerogel granules of each of Examples 1 to 6 and Comparative Examples 4 to 6 was directly measured to calculate an average value, and the average particle diameter of the silica aerogel powder of each of Comparative Examples 1 to 3 was measured using a particle size distribution meter (Microtrac, S3500).

3) Measurement of Apparent Density (g/ml)

The silica aerogel granules or the silica aerogel powder of each of Examples 1 to 6 and Comparative Examples 1 to 6 were injected into a measuring cylinder of 25 ml (1 ml interval), and the apparent density thereof after 3 seconds and the apparent density thereof after 1 hour were respectively measured. At this time, the amount of the silica aerogel granules and the amount of the powder were 23±2 ml at the point of 3 seconds after the injection, and the apparent density was calculated by measuring the volume for the mass injected into the measuring cylinder.

Figure 3:
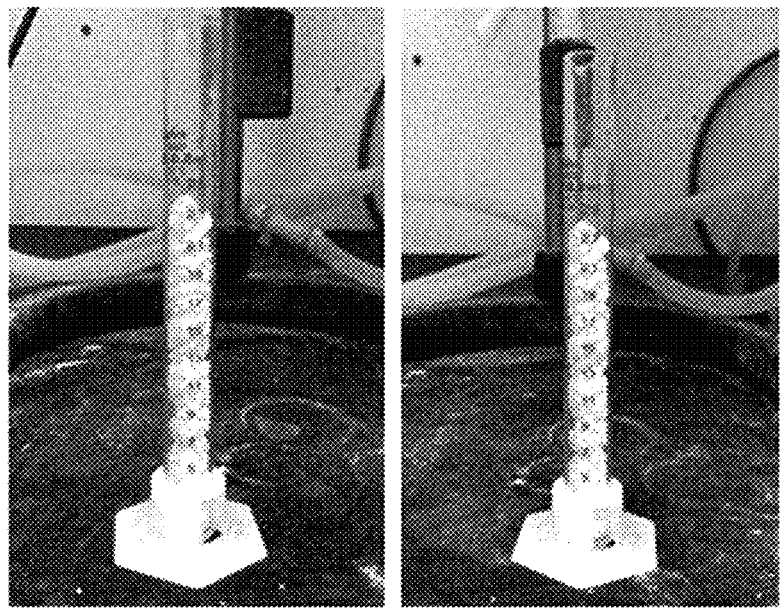
FIG. 3 is a photograph showing change in volume of silica aerogel granules of Example 2 over time.
Figure 4:
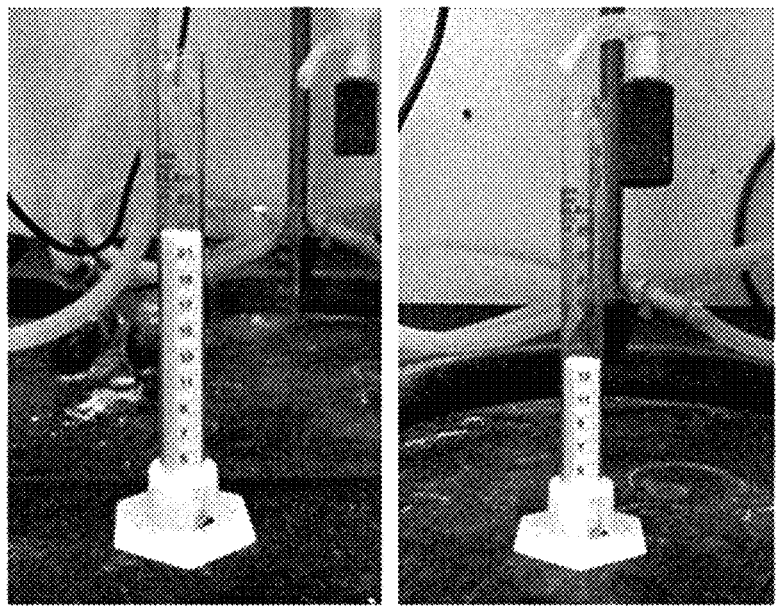
FIG. 4 is a photograph showing change in volume of silica aerogel granules of Comparative Example 1 over time.

Also, photographs of the measuring cylinders showing the volume change of the silica aerogel granules of Example 2 and the silica aerogel powder of Comparative Example 1 over time are respectively shown in FIG. 3 and FIG. 4.

4) Measurement of Change in Apparent Density (%)

Using the apparent density measured after 3 seconds and the apparent density measured after 1 hour in 3), the rate of change in apparent density was measured from Equation 1 below. The lower the rate of change in apparent density, the lower the scattering properties.

$$\text{(apparent density change rate, \%)} = \frac{\left(\begin{array}{c}\text{apparent density after 1 hr} - \\ \text{apparent density after 3 sec}\end{array}\right)}{\text{(apparent density after 3 sec)}} \times 100 \quad \text{[Equation 1]}$$

TABLE 1

| Classification | Specific surface area (m²/g) | Average particle diameter (D₅₀) | Apparent density | | Rate of change in apparent density (%) |
| --- | --- | --- | --- | --- | --- |
| | | | After 3 seconds (g/ml) | After 1 hour (g/ml) | |
| Example 1 | 694 | 1.5 cm | 0.112 | 0.112 | 0 |
| Example 2 | 678 | 1.3 cm | 0.119 | 0.119 | 0 |
| Example 3 | 657 | 1.7 cm | 0.124 | 0.124 | 0 |
| Example 4 | 645 | 1.1 cm | 0.131 | 0.131 | 0 |
| Example 5 | 649 | 1.3 cm | 0.142 | 0.142 | 0 |
| Example 6 | 640 | 1.8 cm | 0.165 | 0.165 | 0 |
| Comparative Example 1 | 704 | 37 μm | 0.034 | 0.054 | 58 |
| Comparative Example 2 | 697 | 42 μm | 0.043 | 0.064 | 47 |
| Comparative Example 3 | 693 | 45 μm | 0.076 | 0.092 | 21 |
| Comparative Example 4 | 578 | 0.8 cm | 0.242 | 0.242 | 0 |
| Comparative Example 5 | 483 | 0.8 cm | 0.293 | 0.293 | 0 |
| Comparative Example 6 | 475 | 0.6 cm | 0.324 | 0.324 | 0 |

As shown in Table 1, in the case of Example 1 to Example 6 produced by the production method according to an embodiment of the present invention, it was confirmed that the average particle size thereof was 0.1 cm or greater and the particles were physically grouped together to form a large particle (aggregation). Therefore, it was confirmed that silica aerogel granules were produced. On the other hand, in the case of Comparative Examples 1 to 3, it was confirmed that the average particle diameter thereof were 37 μm, 42 μm, 45 μm, respectively, all having small values of a μm level, and silica aerogel powder was produced in which particles were independently present. In the case of Comparative Examples 4 to 6, the average particle diameter thereof was 0.1 cm or greater, so that it was confirmed that granules were produced.

Figure 2:
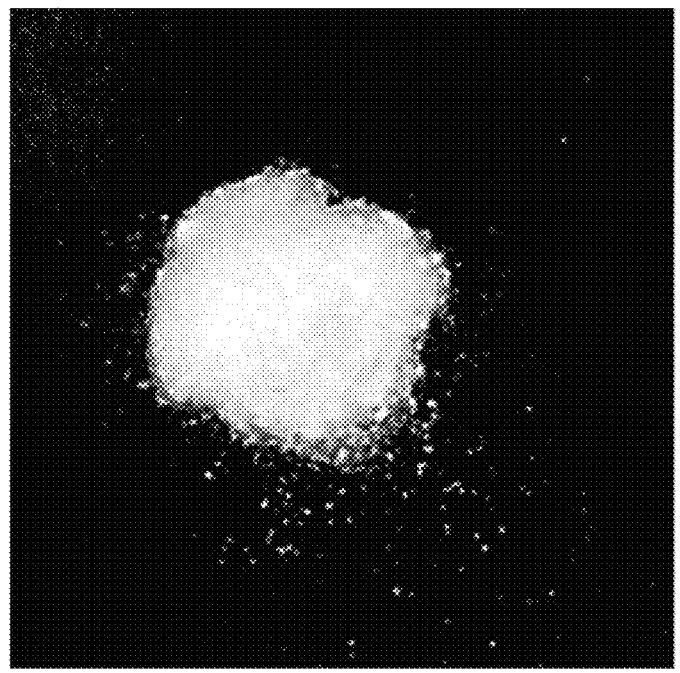
FIG. 2 is a photograph of silica aerogel granules of Comparative Example 1 of the present invention.

It is also possible to confirm the above through FIGS. 1 and 2. FIG. 1, which is a photograph of the silica aerogel of Example 1, clearly shows that the silica aerogel has a granule form. FIG. 2, which is a photograph of the silica aerogel of Comparative Example 2, shows that the silica aerogel has a powder form.

Also, in order to show the degree of scattering properties, the rate of change in apparent density after a predetermined period of time was measured and shown in Table 1. In the case of Examples 1 to 6 and Comparative Examples 4 to 6 in which silica aerogel granules were produced, it was confirmed that there was no change between the apparent density of the silica aerogel after 3 seconds and the apparent density of the silica aerogel after 1 hour. From the results, it was confirmed that silica aerogel granules with suppressed scattering properties were produced. In addition, in the case of Comparative Examples 1 to 3, it was confirmed that there was change between the apparent density of the silica aerogel after 3 seconds and the apparent density of the silica aerogel after 1 hour and the rate of change was significantly great. From the results, it was confirmed that silica aerogel powder having high scattering properties was produced in each of Comparative Examples 1 to 3.

It is also possible to confirm the above through FIGS. 3 and 4. FIG. 3 confirms that Example 2 shows no change in volume over time and FIG. 4 confirms that the volume of Comparative Example 1 becomes significantly smaller over time.

In addition, it can be confirmed that Examples 1 to 6 maintain an excellent level of specific surface area without the deterioration in specific surface area even when compared to that of Comparative Examples 1 to 3 which are powder forms, and have a significantly higher specific surface area when compared to that of Comparative Examples 4 to 6 which are the same having granule form.

However, it can be confirmed that Comparative Examples 1 to 3 in which n-heptane was injected in an excess amount as a non-polar organic solvent maintain a specific surface area at a similar level to that of Examples 1 to 6 but silica aerogel in a granule form was not produced as described above. That is, in order to suppress the scattering properties and improve the ease of handling and processability of the hydrophobic silica aerogel powder produced in each of Comparative Examples 1 to 3, there is a disadvantage in that a process of granulation using additional binders, additives, and the like is required.

In addition, it can be confirmed that in the case of Comparative Examples 4 to 6 in which n-heptane was injected in an amount smaller than the range of the present invention, silica aerogel in the form of granules was produced but the specific surface area thereof was significantly lower.

The above results show that the production method according to an embodiment of the present invention is capable of adjusting the form and physical properties of silica aerogel to be produced by adjusting the addition amount of a non-polar organic solvent, and accordingly, it can be confirmed that silica aerogel produced by the production method according to an embodiment of the present invention is produced in the form of granules without the deterioration in specific surface area.

The invention claimed is:

1. A method for producing hydrophobic silica aerogel granules, the method comprising:
   1) preparing a water glass dispersion by adding a water glass solution to an inorganic acid;
   2) preparing a hydrophobic silica wet gel by adding the water glass dispersion, a surface modifier, and a non-polar organic solvent into a reactor to be subjected to a reaction; and
   3) drying the hydrophobic silica wet gel,
   wherein the non-polar organic solvent is added in an amount of greater than 83 vol % to less than 100 vol % based on the volume of the silica wet gel,
   wherein the hydrophobic silica aerogel granules have an average particle diameter ($D_{50}$) of 0.5 to 2.5 cm, and
   wherein the drying in Step 3) is performed by atmospheric drying for 1 hour to 8 hours under temperature conditions of 100° C. to 190° C.

2. The method of claim 1, wherein the non-polar organic solvent is added in an amount of 85 vol % to 97 vol % based on the volume of the silica wet gel.

3. The method of claim 1, wherein the non-polar organic solvent is one or more solvents selected from the group consisting of hexane, heptane, toluene and xylene.

4. The method of claim 1, wherein the non-polar organic solvent is heptane.

5. The method of claim 1, wherein the inorganic acid is added in a molar ratio of 1 to 3 with respect to water glass in the water glass solution.

6. The method of claim 1, wherein the inorganic acid is one or more inorganic acids selected from the group consisting of nitric acid, hydrochloric acid, sulfuric acid, and hydrofluoric acid.

7. The method of claim 1, wherein the surface modifier is one or more surface modifiers selected from the group consisting of trimethylchlorosilane (TMCS), hexamethyldisilazane (HMDS), methyltrimethoxysilane, trimethylethoxy-silane, ethyltriethoxysilane and phenyltriethoxysilane.

8. The method of claim 1, wherein the surface modifier is added in an amount such that the molar ratio of the surface modifier with respect to water glass in the water glass dispersion is 0.1 to 10.

9. The method of claim 1, wherein the hydrophobic silica aerogel granules have a specific surface area of 600 $m^2/g$ to 1,000 $m^2/g$.

10. The method of claim 1, wherein the hydrophobic silica aerogel granules are silica aerogel particles agglomerated by physical bonding.

\* \* \* \* \*